(12) United States Patent
Chu

(10) Patent No.: US 8,725,199 B2
(45) Date of Patent: *May 13, 2014

(54) SYSTEM INCLUDING BLUETOOTH MODULE AND WIRELESS LAN MODULE AND CONTROL METHOD THEREOF

(71) Applicant: HTC Corporation, Taoyuan (TW)

(72) Inventor: Shih-Hung Chu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/779,563

(22) Filed: Feb. 27, 2013

(65) Prior Publication Data

US 2013/0178164 A1 Jul. 11, 2013

Related U.S. Application Data

(63) Continuation of application No. 12/768,054, filed on Apr. 27, 2010, now Pat. No. 8,412,262.

(30) Foreign Application Priority Data

Apr. 29, 2009 (TW) .............................. 98114195 A

(51) Int. Cl.
*H04M 1/00* (2006.01)
*H04W 36/00* (2009.01)

(52) U.S. Cl.
USPC ....................... 455/550.1; 455/444

(58) Field of Classification Search
USPC ............................. 455/444, 550.1
See application file for complete search history.

(56) References Cited

U.S. PATENT DOCUMENTS

| | | | |
|---|---|---|---|
| 2007/0135162 A1* | 6/2007 | Banerjea et al. | 455/556.1 |
| 2007/0232358 A1 | 10/2007 | Sherman | |
| 2007/0275746 A1* | 11/2007 | Bitran | 455/509 |
| 2008/0205365 A1* | 8/2008 | Russell et al. | 370/341 |
| 2008/0233875 A1 | 9/2008 | Desai et al. | |
| 2008/0254745 A1 | 10/2008 | Zhang et al. | |
| 2008/0285536 A1* | 11/2008 | Kaidar et al. | 370/345 |
| 2008/0287158 A1 | 11/2008 | Rayzman et al. | |
| 2009/0054009 A1 | 2/2009 | Yang et al. | |
| 2009/0081962 A1* | 3/2009 | Sohrabi | 455/79 |
| 2009/0312010 A1* | 12/2009 | Hall | 455/426.1 |
| 2010/0142500 A1* | 6/2010 | Sudak | 370/338 |

FOREIGN PATENT DOCUMENTS

| | | |
|---|---|---|
| CN | 101384089 A | 3/2009 |
| TW | 200715724 | 4/2007 |

* cited by examiner

*Primary Examiner* — Nathan Mitchell
(74) *Attorney, Agent, or Firm* — Birch, Stewart, Kolasch & Birch, LLP

(57) ABSTRACT

An embodiment of the disclosure provides a control method between a Bluetooth module and a wireless LAN module, for an electronic device with a Bluetooth module and a WiMAX module. The method comprises: determining whether the priority of the Bluetooth module is higher than that of the WiMAX module; determining whether data transmitted or received by the WiMAX module has to be protected; and when the priority of the Bluetooth module is not higher than that the WiMAX module and the data transmitted or received by the WiMAX module has to be protected, setting the Bluetooth module to be in an inactive mode.

17 Claims, 8 Drawing Sheets

| Mode | Input signal | | | |
|---|---|---|---|---|
| | Bluetooth module | | WiMAX module | |
| | BT_PRI_DATA | BT_PA_ON | WIMAX_COEXISTENCE_PROTECTION | PA_EN_WIMAX_CONTROL |
| 1 | 0 | 0 | 0 | 0 |
| 2 | 0 | 0 | 0 | 1 |
| 3 | 0 | 0 | 1 | 0 |
| 4 | 0 | 0 | 1 | 1 |
| 5 | 0 | 1 | 0 | 0 |
| 6 | 0 | 1 | 0 | 1 |
| 7 | 0 | 1 | 1 | 0 |
| 8 | 0 | 1 | 1 | 1 |
| 9 | 1 | 0 | 0 | 0 |
| 10 | 1 | 0 | 0 | 1 |
| 11 | 1 | 0 | 1 | 0 |
| 12 | 1 | 0 | 1 | 1 |
| 13 | 1 | 1 | 0 | 0 |
| 14 | 1 | 1 | 0 | 1 |
| 15 | 1 | 1 | 1 | 0 |
| 16 | 1 | 1 | 1 | 1 |

FIG. 3a

| Mode | Output signal | | Note |
| --- | --- | --- | --- |
| | W_ACTIVE | PA_EN | |
| 1 | 0 | 0 | BT/WiMax RX permit |
| 2 | 0 | 1 | BT RX permit, WiMax no active |
| 3 | 1 | 0 | BT RX no permit, WiMax RX permit |
| 4 | 1 | 1 | BT RX no permit, WiMax TX permit |
| 5 | 0 | 0 | BT TX permit, WiMax no active |
| 6 | 0 | 1 | BT/WiMax TX permit |
| 7 | 1 | 0 | BT TX not permit, WiMax RX permit |
| 8 | 1 | 1 | BT TX not permit, WiMax TX permit |
| 9 | 0 | 0 | BT/WiMax RX permit |
| 10 | 0 | 1 | BT RX permit, WiMax no active |
| 11 | 0 | 0 | BT/WiMax RX permit |
| 12 | 0 | 1 | BT RX permit, WiMax no active |
| 13 | 0 | 0 | BT TX permit, WiMax no active |
| 14 | 0 | 0 | BT TX permit, WiMax no active |
| 15 | 0 | 0 | BT TX permit, WiMax no active |
| 16 | 0 | 0 | BT TX permit, WiMax no active |

SYSTEM INCLUDING BLUETOOTH MODULE AND WIRELESS LAN MODULE AND CONTROL METHOD THEREOF

CROSS REFERENCE TO RELATED APPLICATIONS

The present application is a 37 C.F.R. §1.53(b) continuation of U.S. patent application Ser. No. 12/768,054 filed Apr. 27, 2010, which claims priority on Taiwanese Patent Application No. 098114195, filed on Apr. 29, 2009. The entire contents of all of the above applications are hereby incorporated by reference.

BACKGROUND OF THE INVENTION

1. Field of the Invention

The invention relates to an electronic device, and more particularly to an electronic with a co-existence mechanism for a wireless LAN module and a Bluetooth module.

2. Description of the Related Art

Presently, WiMAX (Worldwide Interoperability for Microwave Access) technology has advantages of a long transmission distance, a broad coverage range and a fast transmission rate. Thus, WiMAX technology becomes a basic function of most portable electronic devices. The frequency bands supported by the WiMAX technology are 2.5 GHz, 3.5 GHz and 5.8 GHz, wherein the frequency band of 2.5 GHz is close to the frequency band of 2.4 GHz of the Bluetooth technology. Accordingly, interference may occur between the WiMAX and Bluetooth frequency bands when both WiMAX and Bluetooth are implemented and used in the same electronic device.

BRIEF SUMMARY OF THE INVENTION

An embodiment of the present disclosure provides a control method between a Bluetooth module and a wireless LAN module, for an electronic device with a Bluetooth module and a WiMAX module. The method comprises: determining whether the priority of the Bluetooth module is higher than that of the WiMAX module; determining whether data transmitted or received by the WiMAX module has to be protected; and setting the Bluetooth module to be in an inactive mode when the priority of the Bluetooth module is not higher than that of the WiMAX module and the data transmitted or received by the WiMAX module has to be protected.

Another embodiment of the present disclosure provides an electronic device with a Bluetooth module and a wireless LAN module. The electronic device comprises a Bluetooth module, a wireless LAN module, a WiMAX module and a logic circuit. The logic circuit is configured to select one of the wireless LAN module and the WiMAX module to be electronically connected to the Bluetooth module, determine whether the priority of the Bluetooth module is higher than that of the WiMAX module, and determine whether data transmitted or received by the WiMAX module has to be protected. When the priority of the Bluetooth module is not higher than that of the WiMAX module and the data transmitted or received by the WiMAX module has to be protected, the Bluetooth module is set to an inactive mode.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 3a and FIG. 3b show modes of an embodiment of a co-existence mechanism between the WiMAX module and the Bluetooth module according to the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
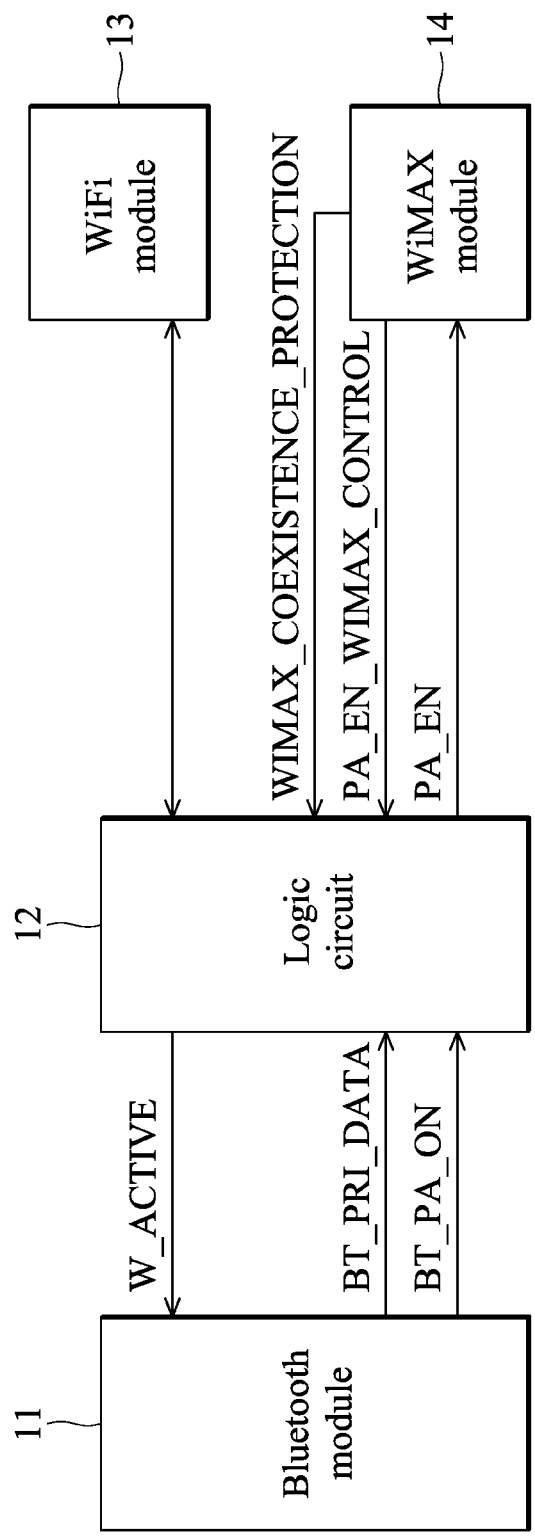
FIG. 1 is a schematic diagram of an embodiment of an electronic device 10 with a Bluetooth module and a wireless LAN module according to the invention.

FIG. 1 is a schematic diagram of an embodiment of an electronic device 10 with a Bluetooth module and a wireless LAN module according to the invention. The electronic device 10 comprises a Bluetooth module 11, a logic circuit 12, a WiFi module 13 and a WiMAX module 14. The logic circuit 12 selectively and electrically connects the Bluetooth module 11 to the WiFi module 13 or the WiMAX module 14. In this embodiment, the electronic device 10 can operate at a first operation mode and a second operation mode. In the first operation mode, the logic circuit 12 electrically connects the Bluetooth module 11 to the WiFi module 13 so that the Bluetooth module 11 and the WiFi module 13 can share radio frequency elements (not shown in FIG. 1), such as an antenna, a power amplifier or a low noise amplifier, through a conventional PTA (Packet Traffic Arbitration) mechanism. In the second operation mode, the logic circuit 12 electrically connects the Bluetooth module 11 to the WiMAX module 14 so that the Bluetooth module 11 and the WiMAX module 14 can share radio frequency elements (not shown in FIG. 1), such as an antenna, a power amplifier or a low noise amplifier, through the proposed control mechanism of the disclosure. It is noted that the WiFi module 13 and the WiMAX module 14 cannot operate at the same time. The co-existence mechanism, i.e. the PTA mechanism, between the Bluetooth module 11 and the WiFi module 13 is a conventional mechanism and not discussed here for brevity. The following descriptions focus on the control mechanism between the Bluetooth module 11 and the WiMAX module 14.

In this embodiment, the logic circuit 12 determines whether to enable the WiMAX module 14 and/or Bluetooth module 11 according to the priority of the Bluetooth module 11, the priority of the WiMAX module 14 and the detected mode of the Bluetooth module 11, such as a transmit mode or a receive mode. The following description relates to definitions of the signals in FIG. 1.

W_Active: This signal is set to 0 or 1 according to the priority of the Bluetooth module 11 and whether the data transmitted or received by the WiMAX module 14 has to be protected. If the data transmitted by the WiMAX module 14 has to be protected, i.e., the signal WIMAX_COEXISTENCE_ PROTECTION is 1, and the priority of the Bluetooth module 11 is lower than the priority of the WiMAX module 14, i.e., the signal BT_PRI_DATA is 0, signal W_Active is set to be 1. If the data transmitted by the WiMAX module 14 does not have to be protected, i.e., the signal WIMAX_COEXISTENCE_PROTECTION is 0, or the priority of the Bluetooth module 11 is higher than the priority of the WiMAX module 14, i.e., the signal BT_PRI_DATA is 1, signal W_Active is set to be 0. In this embodiment, when W_Active is 1, the power amplifier of the Bluetooth module 11 (not shown in FIG. 2) is disabled so that the Bluetooth module 11 cannot transmit data. Please be noted that the embodiment is illustrated with the WiMAX module 14; however, the signal W_Active can also be applied to the WiFi module 13. Thus, the signal W_Active can be applied to implement the co-existence mechanism between the WiFi module 13 and the Bluetooth module 11, as only one of the WiFi module 13 and WiMAX module 14 can be enabled at one time.

BT_PRI_DATA: This signal indicates the priority of packets transmitted or received by the Bluetooth module 11. In this embodiment, when the priority of packets transmitted or received by the Bluetooth module 11 is higher than that of packets transmitted or received by the WiMAX module 14, signal BT_PRI_DATA is set to be 1. When the priority of packets transmitted or received by the Bluetooth 11 is lower than that of packets transmitted or received by WiMAX module 14, signal BT_PRI_DATA is set to be 0.

BT_PA_ON: This signal indicates whether the Bluetooth module 11 is in a receiving mode or a transmitting mode. When the Bluetooth module 11 is in the receiving mode, signal BT_PA_ON is set to be 0. When the Bluetooth module 11 is in the transmitting mode, signal BT_PA_ON is set to be 1.

WIMAX_COEXISTENCE_PROTECTION: This signal indicates whether the data transmitted or received by the WiMAX module 14 has to be protected. If the data transmitted or received by the WiMAX module 14 does not have to be protected, the signal WIMAX_COEXISTENCE_PROTECTION is set to be 0. If the data transmitted or received by the WiMAX module 14 has to be protected, the signal WIMAX_COEXISTENCE_PROTECTION is set to be 1. In this embodiment, when the priority of the Bluetooth module 11 is higher than the priority of WiMAX module 14, i.e., signal BT_PRI_DATA is 1, and when the Bluetooth module 11 is in the transmitting mode, the logic circuit 12 controls the WiMAX module 14 to stop receiving data if the WiMAX module 14 is receiving data and its received data has to be protected, i.e., the signal WIMAX_COEXISTENCE_PROTECTION is 1; meanwhile, the WiMAX module 14 can send a request to the base station for requesting the base station to stop transmitting data to the WiMAX module 14.

When the priority of the Bluetooth module 11 is higher than the priority of WiMAX module 14, i.e., signal BT_PRI_DATA is 1, and when the Bluetooth module 11 is in the transmitting mode, the logic circuit 12 controls the WiMAX module 14 to stop transmitting data if the WiMAX module 14 is transmitting data and its transmitted data has to be protected, i.e., the signal WIMAX_COEXISTENCE_PROTECTION is 1; meanwhile, the WiMAX module 14 reserves the remaining data, which has not been transmitted, and when the logic circuit 12 enables the WiMAX module 14 again, the WiMAX module 14 begins transmitting the remaining data.

PA_EN_WIMAX_CONTROL: This signal indicates whether the WiMAX module 14 is in a transmitting mode. When the WiMAX module 14 is in the transmitting mode, the signal PA_EN_WIMAX_CONTROL is set to be 1; and when the WiMAX module 14 is not in the transmitting mode, the signal PA_EN_WIMAX_CONTROL is set to be 0.

PA_EN: This signal indicates whether the power amplifier of the WiMAX module 14 is enabled.

In this embodiment, when the priority of the Bluetooth module 11 is higher than the priority of WiMAX module 14, the WiMAX module 14 is inactive, i.e., the WiMAX module 14 does not function. Additionally, when the Bluetooth module 11 is in the transmitting mode, the baseband chip or power amplifier of the WiMAX module 14 can be disabled to make the WiMAX module 14 inactive. When the Bluetooth module 11 is in the receiving mode and the WiMAX module 14 is also in the receiving mode, the Bluetooth module 11 and the WiMAX module 14 can function simultaneously. However, in another embodiment, to ensure that the Bluetooth module 11 is not affected by the WiMAX module 14, the WiMAX module 14 can still be set to be inactive.

When the priority of the Bluetooth module 11 is lower than the priority of WiMAX module 14, whether the Bluetooth module 11 can operate or not is determined according to the signal W_Active. If signal W_Active is 0, which indicates that the data received or transmitted by the WiMAX module 14 does not have to be protected (i.e., the signal WIMAX_COEXISTENCE_PROTECTION is 0), the Bluetooth module 11 can receive or transmit data. If signal W_Active is 1, which indicates that the data received or transmitted by the WiMAX module 14 has to be protected (i.e., the signal WIMAX_COEXISTENCE_PROTECTION is 1), the Bluetooth module 11 is not permitted to receive or transmit data, i.e., the Bluetooth module 11 is disabled and thus inactive.

Figure 2:
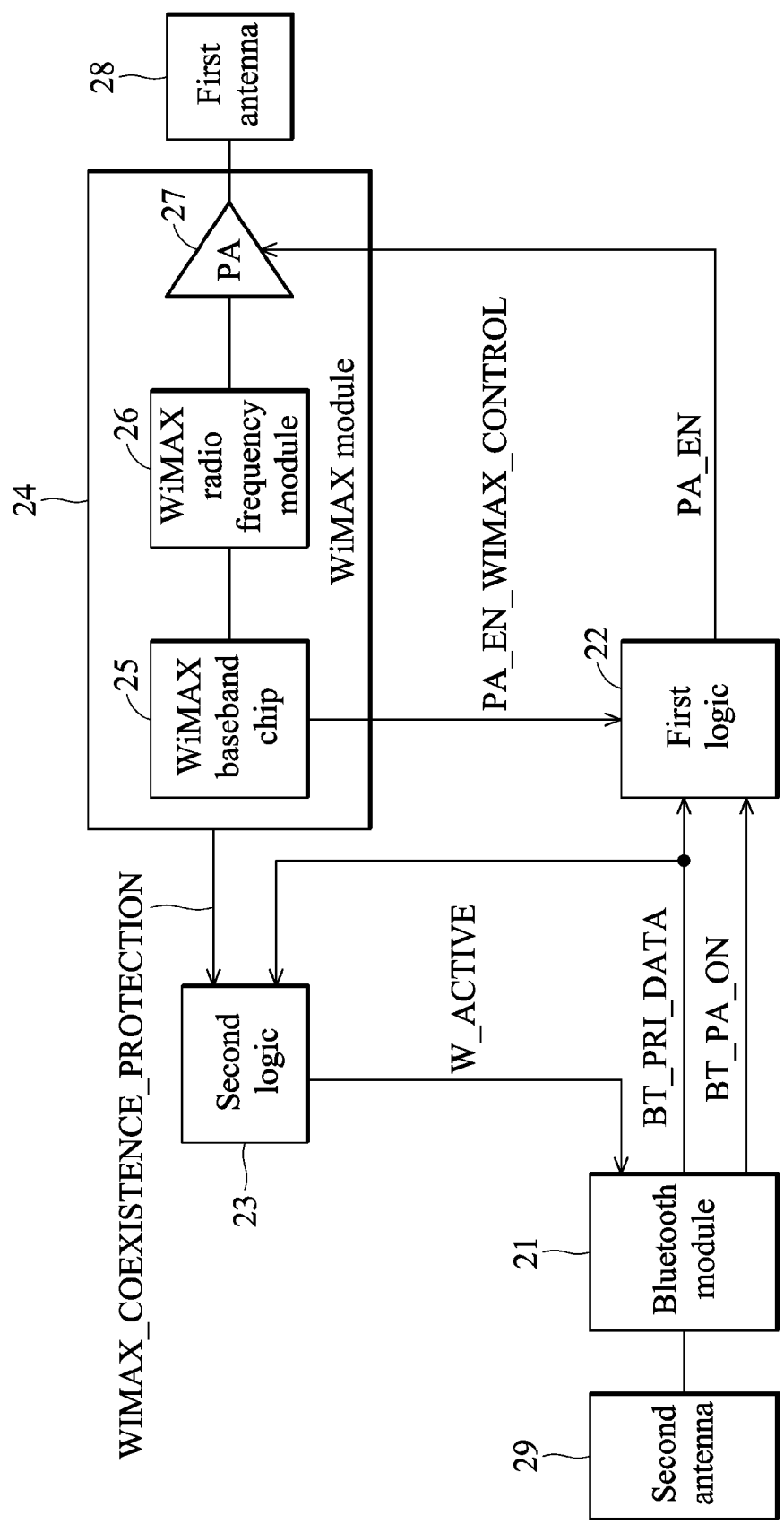
FIG. 2 is a schematic diagram of another embodiment of an electronic device 10 with a Bluetooth module and a wireless LAN module according to the invention.

For further illustration, please refer to FIG. 2. FIG. 2 is a schematic diagram of another embodiment of an electronic device 10 with a Bluetooth module and a wireless LAN module according to the invention. The WiMAX module 24 comprises a WiMAX baseband chip 25, a WiMAX radio frequency module 26 and a power amplifier 27. The WiMAX module 24 is further coupled to a first antenna 28 and transmits or receives data via the first antenna 28. In this embodiment, the first logic 22 and the second logic 23 can be included in the logic circuit 12 in FIG. 1.

In this embodiment, the Bluetooth module 21 receives or transmits data via the second antenna 29. In another embodiment, the Bluetooth module 21 and the WiMAX module 24 can receive data via the first antenna 28 and a switch circuit (not shown in FIG. 2). Furthermore, the Bluetooth module 21 and the WiMAX module 24 can share the same power amplifier, such as power amplifier 27.

The second logic 23 determines whether the Bluetooth module 21 is active according to the priority of the Bluetooth module 21 and according to whether the data transmitted or received by the WiMAX module 24 has to be protected. Detailed operation is described as follows.

When the priority of the Bluetooth module 21 is lower than the priority of the WiMAX module 24 and the data transmitted or received by the WiMAX module 24 has to be protected, the Bluetooth module 21 is set to be inactive. In other words, if the signal BT_PRI_DATA is 0 and the signal WIMAX_COEXISTENCE_PROTECTION output by the WiMAX module 24 is 1, the signal W_Active received by the Bluetooth module 21 is 1 and the Bluetooth module 21 is inactive.

If the priority of the Bluetooth module 21 is higher than the priority of the WiMAX module 24 (i.e., signal BT_PRI_DATA is 1), the signal W_Active output by the second logic 23 is 0 and the Bluetooth module 21 can receive or transmit data. If signal WIMAX_COEXISTENCE_PROTECTION output by the WiMAX module 24 is 1, the WiMAX module 24 will protect the data being transmitted or received. If the WiMAX module 24 is in a receiving mode, the WiMAX module 24 can send a request to the base station for requesting the base station to stop transmitting data to the WiMAX module 24; afterwards, the WiMAX module 24 sends another request to the base station for requesting the base station to continue to transmit the remaining data to the WiMAX module 24 when the control right is transferred back to the WiMAX module 24. If the WiMAX module 24 is in a transmitting mode, the WiMAX module 24 stops transmitting data and informs the corresponding receiver of the stop of transmitting data. When the control right is transferred back to the WiMAX module 24, the WiMAX module 24 transmits the remaining data to the corresponding receiver.

When the priority of the Bluetooth module 21 is higher than the priority of the WiMAX module 24 and when both the Bluetooth module 21 and the WiMAX module 24 are in the receiving mode, the WiMAX module 24 can be set to receive data according to user's requirements.

The first logic 22 determines whether the power amplifier 27 of the WiMAX module 24 is enabled according to the priority of the Bluetooth module 21 and according to whether both the Bluetooth module 21 and the WiMAX module 24 are in the transmitting modes. If the power amplifier 27 is disabled, it is indicated that the WiMAX module 24 cannot transmit data. If the power amplifier 27 is enabled, it is not indicated that the WiMAX module 24 can transmit data because the WiMAX baseband chip 25 may be inactive.

The first logic 22 determines the operation mode of the Bluetooth module 21 and determines whether the priority of the Bluetooth module 21 is higher than that of the WiMAX module 24, according to the signals BT_PA_ON and BT_PRI_DATA. The first logic 22 then determines whether the WiMAX module 24 is in the transmitting mode according to the signal PA_EN_WIMAX_CONTROL of the WiMAX module 24. If the priority of the Bluetooth module 21 is higher than that of the WiMAX module 24, the WiMAX module 24 is not permitted to be in the transmitting mode. If the priority of the Bluetooth module 21 is higher than that of the WiMAX module 24 and the Bluetooth module 21 is in the receiving mode, the WiMAX module 24 can be set to be in the inactive mode or the receiving mode. If the priority of the Bluetooth module 21 is lower than that of the WiMAX module 24, whether the Bluetooth module 21 is active is determined according to the signal WIMAX_COEXISTENCE_PROTECTION output by the WiMAX module 24.

For further illustration of a co-existence mechanism between the WiMAX module 24 and the Bluetooth module 21, please refer to FIG. 3a and FIG. 3b. FIG. 3a and FIG. 3b show modes of an embodiment of a co-existence mechanism between the WiMAX module and the Bluetooth module according to the invention. In this embodiment, the input signals comprise signals BT_PRI_DATA, BT_PA_ON, PA_EN_WIMAX_CONTROL and WIMAX_COEXISTENCE_PROTECTION. The output signals comprise signals W_Active and PA_EN.

In modes 9 to 16, the WiMAX module 24 does not function except for operating in modes 9 and 11. In modes 9 and 11, even if the priority of the Bluetooth module 21 is higher than that of the WiMAX module, both the WiMAX module 24 and the Bluetooth module 21 are in the receiving mode and can be set to simultaneously receive data.

In modes 1 to 4, the priority of the Bluetooth module 21 is lower than that of the WiMAX module and the Bluetooth module 21 is in the receiving mode; meanwhile, whether the Bluetooth module 21 is active is determined according to the signal WIMAX_COEXISTENCE_PROTECTION output by the WiMAX module 24. If the signal WIMAX_COEXISTENCE_PROTECTION is 1, which indicates that the data received or transmitted by the WiMAX module 24 has to be protected while the WiMAX module 24 is active and the signal W_ACTIVE is set to be 1, the Bluetooth module 21 is set to be inactive such as set in modes 3 and 4. If signal WIMAX_COEXISTENCE_PROTECTION is 0, the Bluetooth module 21 can be set to be in a receiving mode such as set in modes 1 and 2. It is noted that the receiving mode only indicates that the Bluetooth module 21 can receive data and does not indicate that the Bluetooth module 21 is receiving data.

In modes 5 to 8, the priority of the Bluetooth module 21 is lower than that of the WiMAX module 24 and whether the Bluetooth module 21 can transmit data is determined according to the signal W_ACTIVE. If W_ACTIVE is 0, the Bluetooth module 21 can be in a transmitting mode for transmitting data such as in modes 5 and 6. The transmitting mode indicates that the Bluetooth module 21 can transmit data. If W_ACTIVE is 1, the Bluetooth module 21 is set to be inactive such as set in modes 7 and 8 so that the Bluetooth module 21 can not transmit data. Moreover, in mode 6, both the Bluetooth module 21 and the WiMAX module 24 can be set to be in the receiving modes at the same time.

Note that conditions where the WiMAX module 24 is in a transmitting mode while the Bluetooth module 21 is in a receiving mode, or the WiMAX module 24 is in a receiving mode while the Bluetooth module 21 is in a transmitting mode are prohibited, as operating performance of the electronic device 10 would decrease and interference between the Bluetooth module 21 and the WiMAX module 24 may occur.

Figure 4:
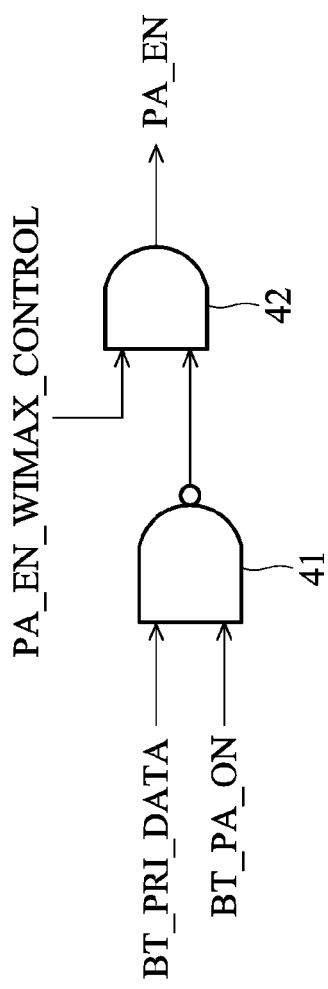
FIG. 4 is a schematic diagram of an embodiment of the first logic in FIG. 2 according to the invention.

FIG. 4 is a schematic diagram of an embodiment of the first logic in FIG. 2 according to the invention. The NAND gate 41 receives signals BT_PRI_DATA and BT_PA_ON output by the Bluetooth module 21. The AND gate 42 generates signal PA_EN, according to the output of NAND gate 41 and the signal PA_EN_WIMAX_CONTROL, to enable or disable the power amplifier 27 of the WiMAX module 24. The truth table of FIG. 4 can be determined according to FIG. 3a and FIG. 3b.

Figure 5:
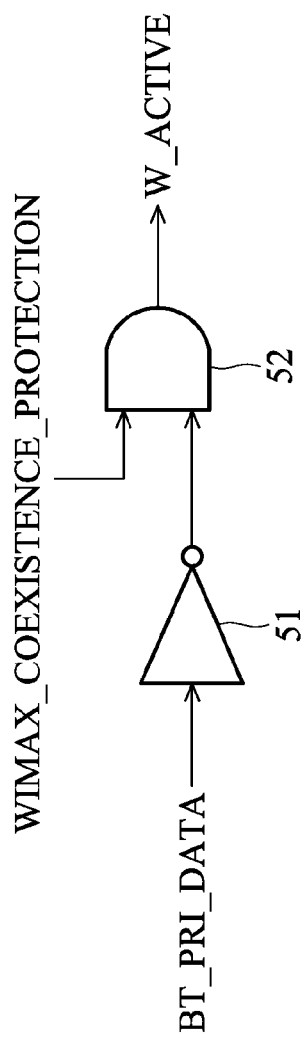
FIG. 5 is a schematic diagram of an embodiment of the second logic in FIG. 2 according to the invention.

FIG. 5 is a schematic diagram of an embodiment of the second logic in FIG. 2 according to the invention. The NOT gate 51 receives and inverts the signal BT_PRI_DATA. The AND gate 52 receives the output signal of the NOT gate 51 and the signal WIMAX_COEXISTENCE_PROTECTION output by the WiMAX module 24 and generates the signal W_ACTIVE for controlling the Bluetooth module 21 to transmit data or not. The truth table of FIG. 5 can be determined according to FIG. 3a and FIG. 3b.

Figure 6:
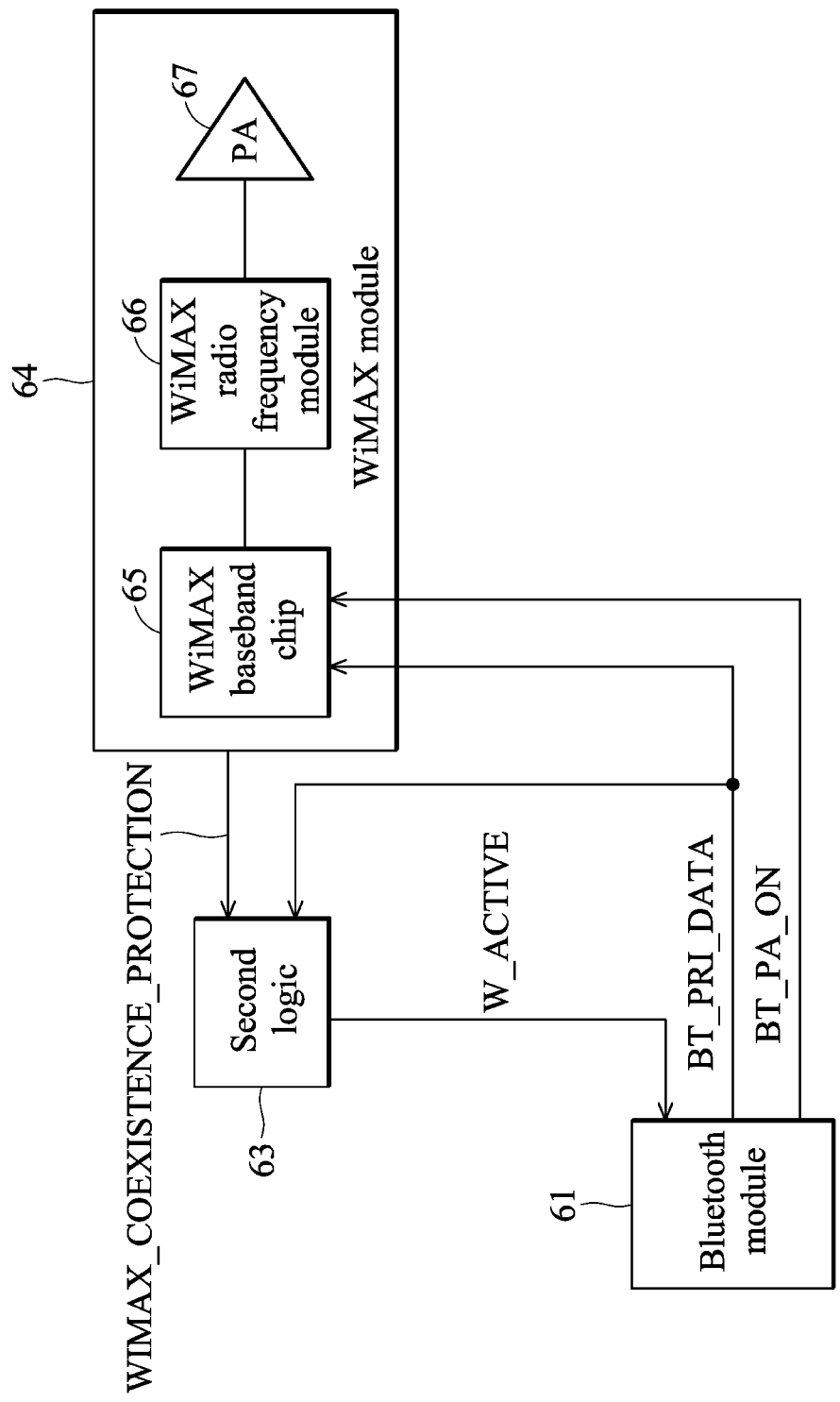
FIG. 6 is a schematic diagram of another embodiment of an electronic device 10 with a Bluetooth module and wireless LAN module according to the invention.

FIG. 6 is a schematic diagram of another embodiment of an electronic device 10 with a Bluetooth module and a wireless LAN module according to the invention. The WiMAX module 64 comprises a WiMAX baseband chip 65, a WiMAX radio frequency module 66 and a power amplifier 67. The second logic 63 generates the signal W_ACTIVE for controlling the Bluetooth module 61 to transmit data or not, according to the signals BT_PRI_DATA output by the Bluetooth module 61 and the WIMAX_COEXISTENCE_PROTECTION output by the WiMAX module 64. The WiMAX baseband chip 65 determines the operation mode of the WiMAX module 64, such as a transmitting mode, a receiving mode or an inactive mode, according to the signals BT_PRI_DATA and BT_PA_ON output by the Bluetooth module 61.

When both the BT_PRI_DATA and BT_PA_ON are 1, which indicates that the priority of the Bluetooth module 61 is higher than the priority of WiMAX module 64 and the Bluetooth module 61 can transmit data in the transmitting mode, the WiMAX baseband chip 65 can set the WiMAX module 64 to be in the inactive mode, i.e. inactive.

When the BT_PRI_DATA is 1 and the BT_PA_ON is 0, which indicates that the priority of the Bluetooth module 61 is higher than the priority of WiMAX module 64 and the Bluetooth module 61 can receive data in the receiving mode, the WiMAX baseband chip 65 can set the WiMAX module 64 to be in the inactive mode or in the receiving mode.

When the BT_PRI_DATA is 0, which indicates that the priority of the Bluetooth module 61 is lower than the priority of WiMAX module 64, whether the Bluetooth module 61 is active is determined according to the signal W_ACTIVE output by the second logic. If the signal W_ACTIVE is 1, the Bluetooth module 61 is set to be in the inactive mode, i.e. inactive. If the signal W_ACTIVE is 0, the Bluetooth module 61 can be set to be in the transmitting mode or the receiving mode.

Figure 7:
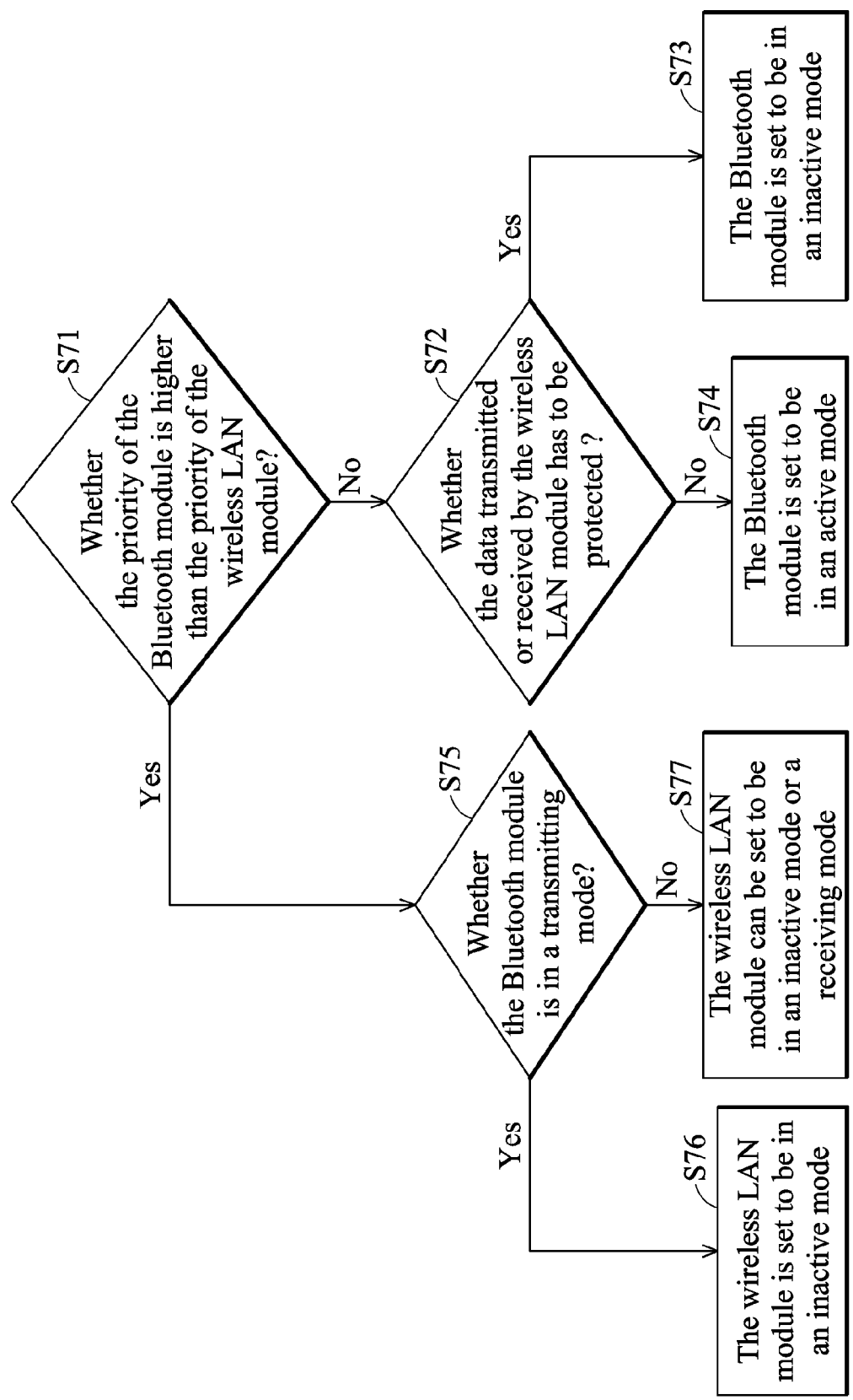
FIG. 7 is a flowchart of an embodiment of the control method between the Bluetooth module and the wireless LAN module according to the invention.

FIG. 7 is a flowchart of an embodiment of a control method between the Bluetooth module and the wireless LAN module according to the invention. The control method of FIG. 7 can be applied to the electronic device in FIG. 1 and FIG. 2. In step S71, it is determined whether the priority of the Bluetooth module is higher than the priority of the wireless LAN module. If the priority of the Bluetooth module is higher than the priority of the wireless LAN module, perform step S75, and if not, perform step S72. In step S72, it is determined whether the data transmitted or received by the wireless LAN module has to be protected. If the data transmitted or received by the wireless LAN module has to be protected, perform step S73 in which the Bluetooth module is set to be in an inactive mode, i.e., the Bluetooth module does not receive or transmit data. If the data transmitted or received by the wireless LAN module does not have to be protected, the Bluetooth module is set to be in an active mode, i.e., the Bluetooth module can receive or transmit data, in step S74. In step S75, it is determined whether the Bluetooth module is in a transmitting mode. If yes, perform step S76 in which the wireless LAN module is set to be in an inactive mode, i.e., the wireless LAN module does not receive or transmit data. If the Bluetooth module is not in the transmitting mode, the wireless LAN module can be set to be in an inactive mode or a receiving mode in step 77.

In this embodiment, the wireless LAN module may be a WiMAX module. Furthermore, the sequence of steps S71, S72 and S75 is not limited to the sequence shown in FIG. 7, and the steps S71, S72 and S75 may be performed in one step, i.e., performed at the same time. For example, steps S71 and S72 can be performed in one step, that is, in one step, it can be determined whether the priority of the Bluetooth module is higher than the priority of the wireless LAN module and whether the data transmitted or received by the wireless LAN module has to be protected. If the priority of the Bluetooth module is not higher than the priority of wireless LAN module and the data transmitted or received by the wireless LAN module has to be protected, the Bluetooth module is set to be in the inactive mode. If the priority of the Bluetooth module is not higher than the priority of the wireless LAN module and the data transmitted or received by the wireless LAN module does not have to be protected, the Bluetooth module can be set to receive or transmit data. Similarly, steps S71 and S75 can be performed in one step; in other words, in one step, it can be determined whether the priority of the Bluetooth module is higher than the priority of wireless LAN module and whether the Bluetooth module is in a transmitting mode. If the priority of the Bluetooth module is higher than the priority of the wireless LAN module and the Bluetooth module is in a transmitting mode, the wireless LAN module is set to be in the inactive mode. If the priority of the Bluetooth module is higher than the priority of the wireless LAN module and the Bluetooth module is not in a transmitting mode, the wireless LAN module is set to be in the inactive mode or the receiving mode.

Furthermore, the step S76 further comprises the following steps. If the wireless LAN module is receiving data, the wireless LAN module stops receiving data and sends a request to the base station for requesting the base station to stop transmitting data to the wireless LAN module. In another aspect, if the wireless LAN module is transmitting data, the wireless LAN module stops transmitting data, reserves the remaining data and transmits the remaining data when the wireless LAN module is enabled again.

Figure 8:
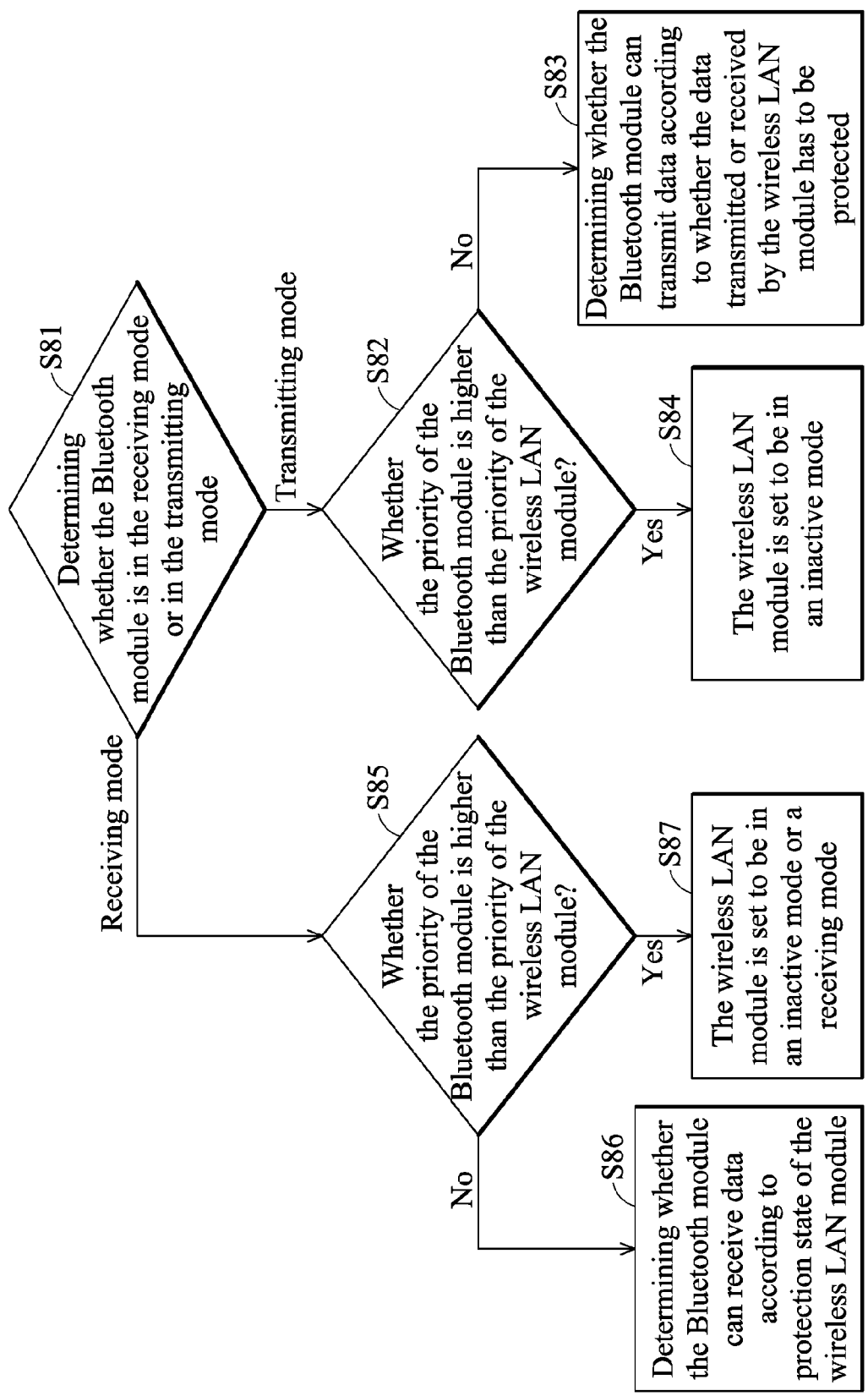
FIG. 8 is a flowchart of another embodiment of the control method between the Bluetooth module and the wireless LAN module according to the invention.

FIG. 8 is a flowchart of another embodiment of the control method between the Bluetooth module and the wireless LAN module according to the invention. The control method of FIG. 8 can be applied to the electronic device in FIG. 1 and FIG. 2. In step S81, it is determined whether the Bluetooth module is in the receiving mode or in the transmitting mode. If the Bluetooth module is in the transmitting mode, perform step S82. If the Bluetooth module is in the receiving mode, perform step S85. In step S82, it is determined whether the priority of the Bluetooth module is higher than the priority of the wireless LAN module. If the priority of the Bluetooth module is higher than the priority of the wireless LAN module, perform step S84, in which the wireless LAN module is set to be in an inactive mode. If the priority of the Bluetooth module is lower than the priority of the wireless LAN module, perform step S83, in which it is determined whether the Bluetooth module can transmit data according to whether the data transmitted or received by the wireless LAN module has to be protected. If the data transmitted or received by the wireless LAN module has to be protected, the Bluetooth module is not permitted to transmit data. If the data transmitted or received by the wireless LAN module does not have to be protected, the Bluetooth module can transmit data.

In step S85, it is determined whether the priority of the Bluetooth module is higher than the priority of the wireless LAN module. If the priority of the Bluetooth module is higher than the priority of the wireless LAN module, perform step S87, in which the wireless LAN module is set to be in an inactive mode or a receiving mode. If the priority of the Bluetooth module is lower than the priority of the wireless LAN module, perform step S86, in which it is determined whether the Bluetooth module can receive data according to protection state of the wireless LAN module. If the data transmitted or received by the wireless LAN module has to be protected, the Bluetooth module is not permitted to receive data. If the data transmitted or received by the wireless LAN module does not have to be protected, the Bluetooth module can receive data. In this embodiment, the wireless LAN module is a WiMAX module. Furthermore, the sequence of steps S81, S82 and S85 is not limited to the sequence shown in FIG. 8, and the steps S81, S82 and S85 may be performed in one step.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method for an electronic device with a first wireless communication module supporting a first frequency band and a second wireless communication module supporting a second frequency band, the method comprising:
    determining whether the priority of the first wireless communication module is higher than the priority of the second wireless communication module;
    determining whether data transmitted or received by the second wireless communication module has to be protected; and
    when the priority of the first wireless communication module is not higher than the priority of the second wireless communication module and the data transmitted or received by the second wireless communication module has to be protected, setting the first wireless communication module to be in an inactive mode.

2. The control method as claimed in claim 1, further comprising:
    when the priority of the first wireless communication module is not higher than the priority of the second wireless communication module and the data transmitted or received by the second wireless communication module does not have to be protected, setting the first wireless communication module to be in a transmitting mode or a receiving mode.

3. The control method as claimed in claim 1, further comprising:
    detemining whether the first wireless communication module is in a transmitting mode; and
    when the priority of the first wireless communication module is higher than the priority of the second wireless communication module and the first wireless communication module is in the transmitting mode, setting the second wireless communication module to be in an inactive mode.

4. The control method as claimed in claim 3, further comprising:
    when the priority of the first wireless communication module is higher than the priority of the second wireless communication module and the first wireless communication module is not in the transmitting mode, setting the second wireless communication module to be in a receiving mode.

5. The control method as claimed in claim 3, wherein the step of setting the second wireless communication module to be in the inactive mode further comprises:
    when the second wireless communication module is receiving data, controlling the second wireless communication module to stop receiving data.

6. The control method as claimed in claim 3, wherein the step of setting the second wireless communication module to be in the inactive mode further comprises:
    when the second wireless communication module is transmitting data, controlling the second wireless communication module to stop transmitting data.

7. An electronic device comprising:
    a first wireless communication module;
    a second wireless communication module;
    a third wireless communication module; and
    a logic circuit to select one of the second wireless communication module and the third wireless communication module to be electronically connected to the first wireless communication module, to determine whether the priority of the first wireless communication module is higher than the priority of the second wireless communication module, and to determine whether data transmitted or received by the second wireless communication module has to be protected,
    wherein when the logic circuit determines that the priority of the first wireless communication module is not higher than the priority of the second wireless communication module and the data transmitted or received by the second wireless communication module has to be protected, the first wireless communication module is set to be in an inactive mode.

8. The electronic device as claimed in claim 7, wherein when the logic circuit determines that the priority of the first wireless communication module is not higher than the priority of the second wireless communication module and the data transmitted or received by the second wireless communication module does not have to be protected, the first wireless communication module is set to transmit or receive data.

9. The electronic device as claimed in claim 7, wherein the logic circuit further determines whether the first wireless communication module is in a transmitting mode, and when the priority of the first wireless communication module is higher than the priority of the second wireless communication module and the first wireless communication module is in the transmitting mode, the second wireless communication module is set to be in the inactive mode.

10. The electronic device as claimed in claim 9, wherein when the logic circuit determines that the priority of the first wireless communication module is higher than the priority of the second wireless communication module and the first wireless communication module is not in the transmitting mode, the second wireless communication module is set to be in a receiving mode.

11. The electronic device as claimed in claim 9, wherein when the second wireless communication module is receiving mode, the logic circuit controls the second wireless communication module to stop receiving data.

12. The electronic device as claimed in claim 9, wherein when the second wireless communication module is in a transmitting mode, the logic circuit controls the second wireless communication module to stop transmitting data.

13. The electronic device as claimed in claim 7, wherein the logic circuit further comprises:
    a first logic to generate an enable signal for controlling a first power amplifier of the second wireless communication module to be enabled or not according to a control signal of the second wireless communication module, a priority signal and a mode signal of the first wireless communication module.

14. The electronic device as claimed in claim 13, wherein the first wireless communication module comprises a second power amplifier, and the logic circuit further comprises:
    a second logic to generate a disable signal for disabling the second power amplifier of the first wireless communication module according to a data protected signal of the second wireless communication module and the priority signal of the first wireless communication module.

15. The electronic device as claimed in claim 13, wherein the first logic further comprises:
    a NAND gate to receive the priority signal and the mode signal of the first wireless communication module and generate an output signal according to the priority signal and the mode signal; and
    an AND gate coupled to the NAND gate to receive the output signal of the NAND gate and the control signal and generate the enable signal according to the output signal of the NAND gate and the control signal.

16. The electronic device as claimed in claim 13, wherein the control signal is generated by a baseband chip of the second wireless communication module.

17. The device as claimed in claim 14, wherein the second logic further comprises:
- a NOT gate to receive and invert the priority signal of the first wireless communication module and generate an inverted priority signal; and
- an AND gate coupled to the NOT gate to receive the inverted priority signal and the data protected signal of the second wireless communication module and generate the disable signal according to the inverted priority signal and the data protected signal.

* * * * *